June 27, 1950 — H. BOICE — 2,512,913
FISH LURE
Filed Nov. 13, 1945 — 2 Sheets—Sheet 2

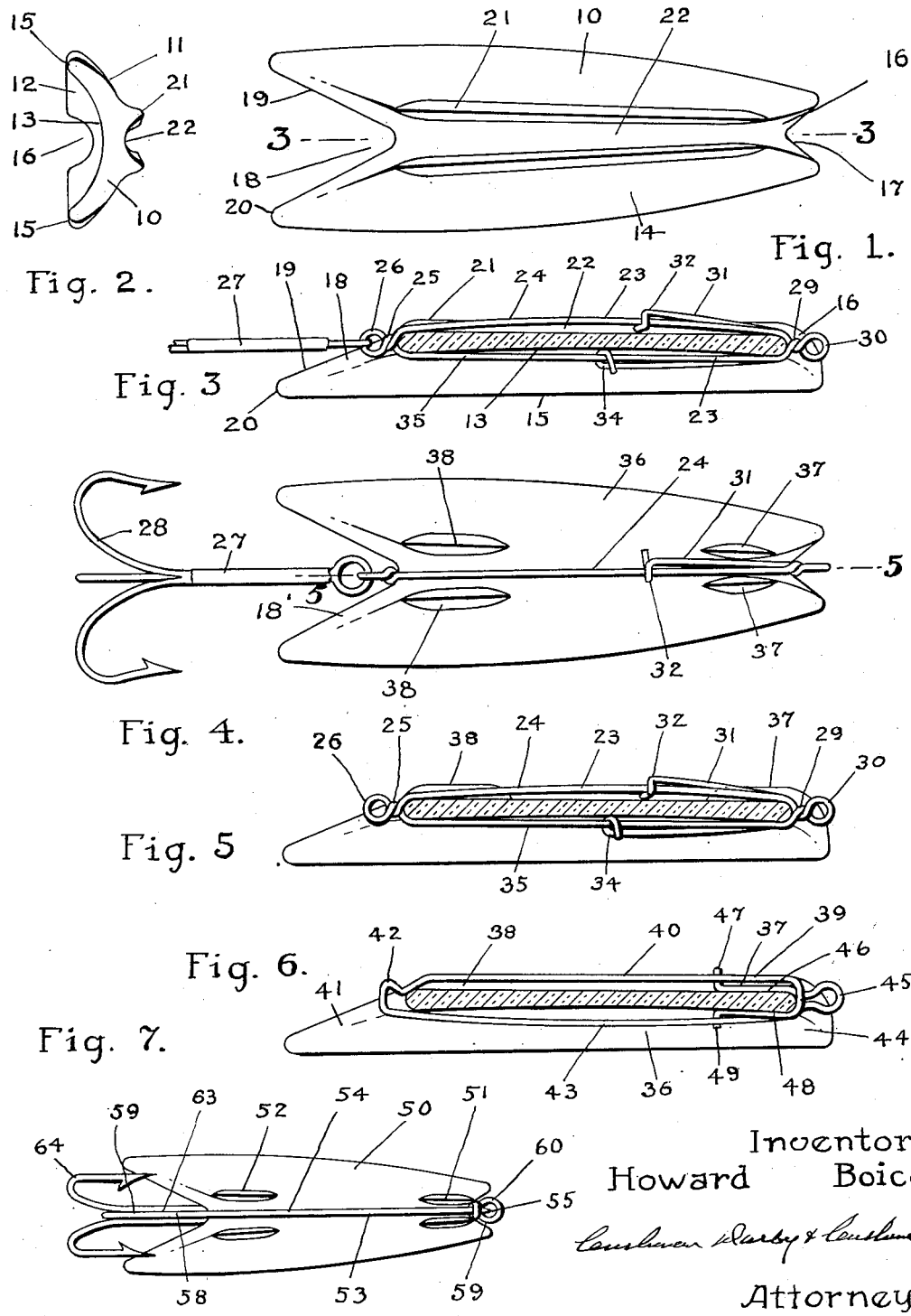

Inventor
Howard Boice
Attorneys

Patented June 27, 1950

2,512,913

UNITED STATES PATENT OFFICE 2,512,913

FISH LURE

Howard Boice, Newburgh, N. Y., assignor to White Cloud Farms, Inc., Rock Tavern, N. Y., a corporation of New York Application November 13, 1945, Serial No. 628,152

16 Claims. (Cl. 43—42.36)

The present invention relates to a new and improved fish lure particularly adapted for use in trolling or casting.

An essential feature of the invention is to provide a lure having a body formed of light and durable ceramic composition and provided with a colored glaze coating of high reflectivity and permanence. The body of the lure is channeled or of concavo-convex shape and has longitudinally spaced straight lower edges. The upper surface of the body is formed with spaced longitudinally disposed projections that constitute oscillators or stabilizing means when the lure is being moved through the water or when casting the lure. The projections also act as retaining means for a harness that may encircle the body of the lure longitudinally.

A further object consists in associating with the body of the lure a removable harness that not only allows releasement of the fish hooks but also provides a direct connection between the hooks and the line so as to relieve the body of strain or pressure to which the line and hooks may be subjected.

Other objects and advantages of the invention will become apparent from the following description when taken in conjunction with the accompanying claims and drawings.

Referring to the drawings in which are shown several preferred embodiments the invention may assume:

Figure 1 is a detailed plan view of the body of the lure.

Figure 2 is a rear-end view of Figure 1.

Figure 3 is a view taken substantially along the lines 3—3 of Figure 1 showing a harness applied thereto.

Figure 4 is a plan view of another form of the invention.

Figure 5 is a longitudinal central sectional view taken substantially along the line 5—5 of Figure 4 with the hooks removed.

Figure 6 is a longitudinal sectional view of the body of the lure showing a modified form of the harness.

Figure 7 is a plan view of another modification.

Figure 8:
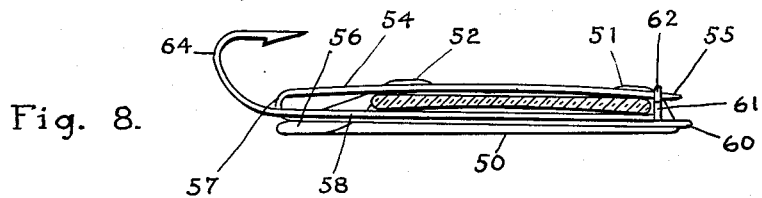
Figure 8 is a longitudinal sectional view of Figure 7.

Referring to the drawings in which like numerals indicate like parts in the several views and more particularly Figure 1, 10 designates the body of the lure which is preferably formed of suitable light ceramic composition that will give the desired and necessary buoyancy to the lure in order that it will not sink when it strikes the water and which imparts to the lure high compressive strength and hardness. The body 10 may vary in size and shape and is shown of elongated formation to give a fishlike appearance thereto. The specific gravity of the composition used to form the body 10 may be adjusted or controlled to a value which allows the lure to operate at the optimum distance either below the surface of the water or to remain on the surface of the water, and in each instance with a minimum of manipulation by the fisherman. The body 10 is preferably glaze coated as at 11 (Figure 2) in order to have a high reflectivity and permanence in a wide range of different colors. This glaze coating may be further coated on the bottom or underside of the lure as at 12 with metallic gold or platinum by a suitable firing process that tends to enhance its wearing and non-tarnishing qualities. The body 10 is preferably of channeled shape to further assist its buoyancy when in the water, and has a concave inner surface 13 and a convex outer surface 14. The inner surface 13 and the outer surface 14 merge into substantially straight horizontal lower edges or runners 15 that serve to maintain the lure on an even keel during its irregular and fishlike motion through the water.

The forward end or head 16 of the lure is centrally notched as at 17 and the rear end or tail is formed with a deep substantially V-shaped slot 18 having downwardly inclined sides 19 that merge into the edges 15 the bottoms of which lie in substantially the same plane as at 20 (Figure 3). Extending upwardly and centrally from the outer convex surface 14 of the body are a pair of longitudinally spaced projections or ridges 21 that constitute oscillators or stabilizing means for the lure when the latter is trolled through the water or cast into the air and which also give a fishlike appearance and action to the lure. These spaced projections are shown in Figures 1 and 2 co-extensive in length with the top of the body and form between them a retaining groove 22 for receiving a removable metal harness 23 (Figure 3). This harness may be formed from a single piece of wire shaped or bent to extend longitudinally and centrally around the body and has its upper portion 24 positioned within the groove 22 so as to be retained in a fixed position when applied to the body. The wire harness 23 is twisted at its rear end 25 to form a loop or eyelet 26 positioned in the slot 18 for receiving the shank 27 of a fish hook 28. The opposite end portion 31 of the wire harness is twisted as at 29 to provide a loop 30 located in the notch 16 so as to receive one end of a fishing line. The end portion 31 of the wire is bent laterally to form a catch 32 that releasably engages the adjacent upper portion 24 of the wire harness. The opposite end of the wire 23 is formed with a similar catch 34 releasably connected to the inner portion 35 of the wire. It will be seen that upon release of the catches 32 and 34 the harness may be readily removed from the body of the lure 10 to allow replacement of the hooks or connect the harness to another body. When the parts are set up, the harness 23 constitutes a direct connection between the hooks and the fishing line so as to relieve the body 10 of any strain or pressure to which the line and hooks may be subjected. The channel-shaped formation of the body 10 acts to increase its buoyancy when trolling and also assists its accuracy when casting. The particular configuration of the body 10 also co-acts with the specific gravity of the ceramic composition used to form the body, to prevent the lure from sinking when it strikes the water and controls the degree of submersion of the lure into the water.

The V-shaped slot 18 gives a fishlike or flylike appearance to the lure and constitutes a guide for the shank 27 of the hooks for the purpose of conveying the hooks directly to the mouth of the striking fish in the shortest possible time and with the utmost accuracy to insure the fish being caught. In other words, when the lure is moved through the water the hooks are disposed substantially parallel to the lure and lessens the possibility of the fish escaping when once caught. The notch 16 at the front of the lure allows water to enter and flow through the concave shaped bottom of the body and forms a pocket for the loop 30 that attaches the harness to the fishing line.

Instead of the space projections extending the length of the body 36 of the lure they may be, and preferably are arranged in spaced pairs; one pair, such as 37, extend upwardly from the head or front end of the lure, (Figure 4) and the other pair 38 are disposed at the rear end and adjacent the slot 18' so as to act as stabilizers for controlling the movement of the lure through the water and also as guide and retaining means for the harness 23. The construction and shape of the body 36 is otherwise substantially the same as the body 10.

The harness may assume various forms and as disclosed in Figure 6, a single piece of wire 39 has a rigid portion 40 extending longitudinally above the top of the body 36 and is bent intermediate its ends and adjacent the U-shaped tail 41 to provide a loop or hook engaging portion 42, having a longitudinally forwardly extending straight portion 43 that is formed adjacent the forward end 44 with a loop 45 to which the fishing line may be connected. Extending from the loop 45 and overlapping the top of the lure is an end portion 46 which terminates in a yieldable catch 47 that detachably engages the adjacent portion 40 of the harness. The free end of the portion 40 extends over and downwardly under the head 44 of the body and is provided with a flexible end portion 48 having a catch 49 to engage the portion 43 at a point underneath the top of the lure. The spaced front and rear pairs of projections 37 and 38 are disposed on opposite sides of the harness to maintain the latter in proper position on the body of the lure.

In the modification shown in Figures 7 and 8, the body 50 of the lure is of substantially the same formation as the form previously described but of a smaller size, and is provided with the spaced pair of projections or ribs 51 and 52 that extend upwardly from the top of the body to constitute a retaining or holding means for the wire harness 53. This harness includes a straight upper portion 54 (Figure 8) having a pointed end 55 and positioned above the top of the body 50. The portion 54 is bent around the tail 56 as at 57 and has a forwardly extending lower straight portion 58 extending centrally and beneath the top of the lure beyond the head or forward end thereof, and projects into the front notch 59 (Figure 7) and bent to form an eyelet or loop 60. Extending upwardly from the loop 60 is a vertical portion 61 the end of which is bent downwardly as at 62 to form a safety pin catch for the pointed end 55 of the portion 54. The shanks 63 of the hooks 64 are welded or otherwise connected to the portion 58 as at 59. Thus it will be seen that the harness 53 upon being applied centrally to the body 50 of the lure may be detachably connected thereto upon engagement of the catch 62 with the pointed portion 55, and may be removed therefrom upon release of the catch 62 from the end 55.

Figure 9:
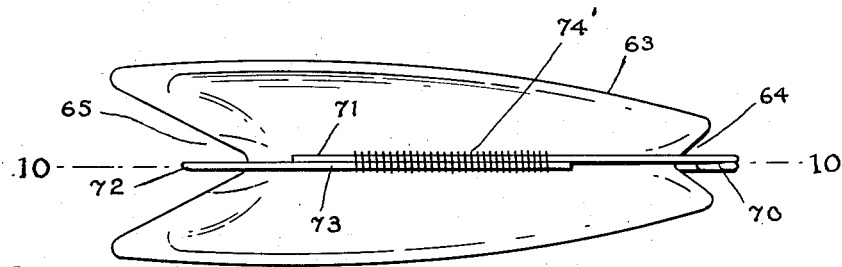
Figure 9 is a bottom plan view of a further modification.
Figure 10:
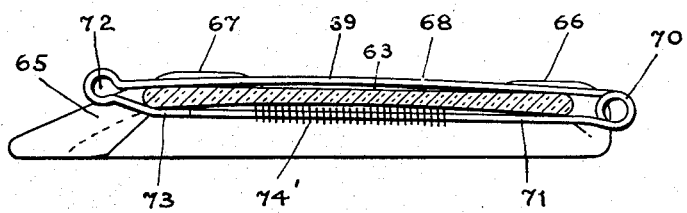
Figure 10 is a longitudinal sectional view taken substantially along the line 10—10 of Figure 9.

In the modification shown in Figure 9 the ceramic body 63 is substantially similar in configuration to the body 36 shown in Figure 4 and has at its forward end a notch or recess 64 and at its rear end a deep V-shaped slot 65. Extending forwardly and centrally from the top of the body, are a front pair of space projections or ridges 66 and a rear pair of projections 67 that constitutes stabilizing means for the lure and a guide for the wire harness 68. This harness has an intermediate portion 69 extending longitudinally and centrally of the top of the body 63 and bent at its forward end to form the coil loop 70 that terminates in a rearwardly extending portion 71 adjacent the bottom of the lure 63. The other end of the portion 69 is bent to form a loop or eyelet 72 positioned within the V-shaped slot 65 and is arranged to receive the shank of a fishing hook. The portion 73 extends forwardly from the loop 72 and under the bottom of the lure 68 so as to overlap with the portion 71 and be firmly secured thereto by a coiled wire wrapping 74'.

Figure 11:
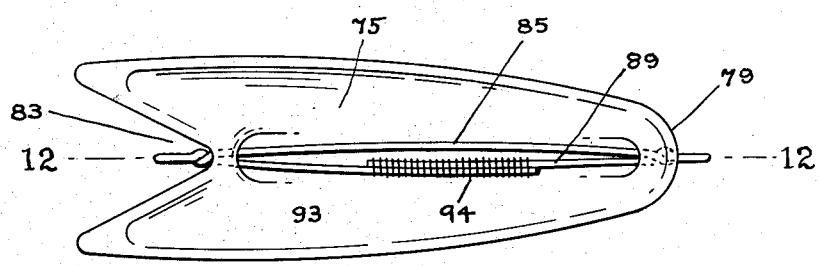
Figure 11 is a bottom plan view of another modification.
Figure 12:
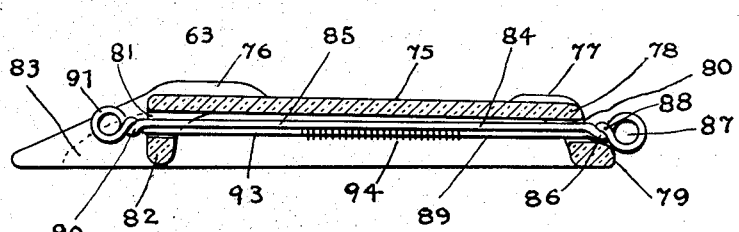
Figure 12 is a longitudinal sectional view taken substantially along the line 12—12 of Figure 11.

In Figures 11 and 12 another modification of the lure is shown in which the elongated body 75 of suitable ceramic composition is channel-shaped and may be provided with a pair of spaced projections or ridges 76 extending upwardly from the rear end thereof and are substantially similar in shape and location to the projections 38 (Fig. 4). A single projection 77 extends centrally from the top of the body 75 and the three projections 76 and 77 co-act to provide stabilizing means for movement of the lure through the water or the air. The forward end or head 78 of the lure is rounded as at 79 and provided with a central opening 80 that aligns with a similar shaped opening 81 formed in a central portion 82 at the rear end of the lure and adjacent the V-shaped slot 83. Extending longitudinally of the lure and loosely through the openings 80 and 81 is a harness 84 formed from a single piece of wire. An intermediate portion 85 of the wire extends outwardly through the opening 80 and is twisted as at 86 to form a loop 87 that projects outwardly from the head of the lure and is arranged to be connected to a fishing line, not shown. A portion of the wire adjacent the loop 87 is bent as at 88 to form a longitudinally extending end portion 89 which extends through the opening 80. The opposite end of the portion 85 extends through opening 81 and is twisted as at 90 to form the loop 91 to which the fishing hooks are connected. A portion of the wire 85 projects forwardly from the loop 91 and forms an end portion 93 that extends through the opening 81 and overlaps the end portion 89 and is secured thereto by a wire wrapping 94. The loops 87 and 91 are of larger diameters than the openings 80 and 81 so as to constitute stops for limiting the longitudinal sliding movement of the harness 84 relative to this body 75. It will be noted that in this form of the invention the harness is longitudinally slidable relative to the body of the lure and provides a direct connection between the hooks and the fish line and also insures the hooks being properly conducted to the mouth of the striking fish when a "catch" is made.

In all forms of the invention the elongated channel-shaped body is formed of a light and durable ceramic composition so as to give the desired buoyancy to the lure and to such shape and size as to attract the particular kind of fish it is intended to catch. The stabilizing means may be in the form of projections extending the length of the lure or be arranged in spaced pairs and in both instances the projections extend upwardly from the top of the lure and are disposed to constitute means for maintaining the harness in its proper position. These projections may be arranged by locating a single projection at the front or head of the lure and a pair at the rear or tail end thereof so as to contribute to the fishlike action of the lure in the water and prevent turning over of the lure when trolling or casting.

The specific gravity of the lure is controlled or adjusted to cause the lure to operate at the most efficient distance below the surface of the water or to remain on the surface of the water, and the colored glaze coating which is preferably applied to each of the lures imparts high reflectivity and permanence. The particular channel shape of the lure produces an irregular fishlike motion which can be manipulated when trolling in the water to resemble an injured fish, and the oscillators or stabilizing means formed by the projections serve to contribute to the action of the lure in the water. The substantially V-shaped slot of the tail of the lure constitutes a rudder and a hook guide that insures the hooks being properly positioned to catch a fish after a strike. The connection of the harness with the hook between the sides of the V-shaped slot limits the turning movement of the shank of the hooks so that when the lure is drawn through the water the hooks are disposed to be guided into the mouth of the fish.

The several forms of the invention shown and described are merely illustrative of preferred embodiments, and it will be understood that such changes may be made as fall within the purview of one skilled in the art without departing from the spirit of the invention and the claims.

I claim:

1. A fish lure of the class described including a body having spaced projections extending upwardly from the top thereof, said projections constituting stabilizing means to maintain the lure on an even keel when moved through the water, said body having at its rear end a V-shaped slot, a harness connected to the body of the lure and extending longitudinally and centrally thereof between said projections, and means on the harness extending into the V-shaped slot for connecting a fish hook shank thereto.

2. A fish lure of the class described including a body having spaced projections extending upwardly from the top thereof, said projections constituting stabilizing means to maintain the lure on an even keel when moved through the water, said body having at its rear end a V-shaped slot, a harness connected to the body of the lure and extending longitudinally and centrally thereof between said projections, the sides of the body having edges the bottoms of which lie in substantially the same plane for maintaining the body on an even keel when passing through the water, and means on the harness extending into the V-shaped slot for connecting a fish hook shank thereto.

3. A fish lure of the class described, including a channel-shaped body having spaced projections extending upwardly from the top thereof, said projections constituting stabilizing means to maintain the lure on an even keel when moved through the water, said body having at its forward end a notch and at its rear end a V-shaped slot, a harness connected to the body of the lure and extending longitudinally and centrally thereof between said projections, means for connecting the harness adjacent the forward end of the body to a fishing line, and means on the harness extending into the V-shaped slot for connecting a fish hook shank thereto.

4. A fish lure of the class described including a channel-shaped body having a pair of spaced projections extending upwardly from the top thereof adjacent its front end and a pair of spaced projections extending upwardly adjacent its rear end, said projection constituting a stabilizing means to maintain the lure on an even keel when moved through the water, said body having at its forward end a central notch and at its rear end a V-shaped slot, a harness connected to the body of the lure and extending longitudinally and centrally thereof between said projections, means for connecting the harness adjacent the forward end of the body to a fishing line, and means on the harness extending into the V-shaped slot for connecting a fishing hook shank thereto.

5. A fish lure of the class described, including an elongated channel shaped body of ceramic composition having a glazed colored coating of high reflectivity, the shape of the body producing fish-like motion to the lure when trolled through the water, spaced projections extending upwardly from the top of the body, said projections contituting stabilizing means to maintain the lure on an even keel when moving through the water, the forward end of the body having a central notch, and the rear end thereof being provided with a substantially V-shaped slot, a harness connected to the body, said projections serving to retain the harness in position on the lure, means connecting one end of the harness to a fishing line, and means connecting the other end of the harness to a fishing hook, the shank of said hook extending into the V-shaped slot, so as to be properly positioned relative to the lure when the latter is moved through the water.

6. A fish lure of the class described including an elongated channel-shaped body of ceramic composition provided with a glazed colored coating of high reflectivity, the shape of the body being such as to impart desired buoyancy thereto when passing through the water and the specific gravity of the body controlling the submergence of the body into the water, said body having a notch at its forward end and a deep V-shaped slot at its rear end, spaced projections adjacent the forward and rear ends of the body and projecting upwardly from the top thereof, a harness detachably connected to the body between said projections a fish hook having a shank extending into the V-shaped slot and connected to the harness, the longitudinal sides of the body having edges the bottoms of which lie in substantially the same plane for maintaining the body on a substantially even keel when passing through the water.

7. A fish lure of the class described including an elongated channel-shaped body of ceramic composition provided with a glazed colored coating of high reflectivity, the shape of the body being such as to impart desired buoyancy thereto when passing through the water and the specific gravity of the body controlling the submergence of the body into the water, said body having a notch at its forward end and a deep V-shaped slot at its rear end, spaced projections adjacent the forward and rear ends of the body and projecting upwardly from the top thereof, a harness detachably connected to the body and having a portion thereof extending longitudinally between said projections and a portion extending beneath the body, a fish hook having a shank extending into the V-shaped slot and connected to the harness, the longitudinal sides of the body having edges the bottoms of which lie in substantially the same plane for maintaining the body on a substantially even keel when passing through the water.

8. A fish lure of the class described including an elongated channel-shaped body having spaced projections extending upwardly from the top thereof, to form stabilizing means to maintain the lure on an even keel when moved through the water, said body having spaced longitudinally disposed openings, a harness extending through said openings, a fish hook connected to one end of said harness and means on the opposite end of the harness for connecting a fishing line thereto.

9. A fish lure of the class described including an elongated channel-shaped body having a pair of spaced projections extending upwardly adjacent the rear end thereof and a single projection extending upwardly from its front end, said body having spaced longitudinally aligned openings, a harness extending loosely through said openings, a substantially V-shaped slot formed in the rear end of the body, and a fishing hook having its shank extending into said slot and connected to the end portion of said harness.

10. A fish lure of the class described including an elongated channel-shaped body having spaced projections extending upwardly from the top thereof, a harness detachably connected to the body, said harness being formed from a single piece of wire bent to encircle the body longitudinally and having a portion disposed between said projections, said harness having an end portion provided with a clasp arranged to releasably engage a portion of the harness to detachably connect the same to the body of the lure.

11. A fish lure of the class described including an elongated channel-shaped body having spaced projections extending upwardly from the top thereof, a wire harness longitudinally encircling the body and having a portion disposed between said projections, said wire being bent at one end to form a loop for receiving a fish line and having a loop at its opposite end for receiving the shank of a fishing hook, one end of the harness having a catch to releasably engage a portion of the harness disposed adjacent the upper surface of the body, said harness having its opposite end portion provided with a catch arranged to engage a portion of the harness disposed adjacent the bottom of the body for releasably connecting the harness to the body.

12. A fish lure of the class described including an elongated channel-shaped body having spaced projections extending upwardly from the top thereof, said body having at its rear end a deep V-shaped slot, a wire harness having portions bent to encircle the body longitudinally and extend between said projections, the rear end of the harness being bent to provide a loop extending into said V-shaped slot, a fish hook shank connected to said loop, and means on the opposite ends of the harness connecting the same to a fishing line.

13. A fish lure of the class described including an elongated channel-shaped body having spaced projections extending upwardly from the top thereof, said body having spaced longitudinally disposed openings disposed centrally thereof, and a harness extending through said openings, and provided at opposite ends with loop portions, said body having a V-shaped slot in the rear end thereof, and a fish hook having its shank extending into said slot and connected to one of the loops of said harness.

14. A fish lure body of the class described having spaced projections extending upwardly from the top thereof, said projections constituting stabilizing means to maintain the lure on an even keel when moved through the water, said body having at its rear end a V-shaped slot, and a harness connected to the body and having a looped end portion extending into the V-shaped slot for connecting a fish hook thereto.

15. A fish lure of the class described including a channel-shaped body of ceramic composition, and spaced projections extending upwardly from the top of the body and constituting stabilizing means to maintain the lure on an even keel when moved through the water.

16. A fish lure of the class described including a channel-shaped body of ceramic composition having a glazed colored coating of high reflectivity, spaced projections extending upwardly from the top of the body and constituting stabilizing means to maintain the lure on an even keel when moved through the water, the rear end of the body being provided with a substantially V-shaped slot, and a harness connected to the body and having a looped portion extending into said slot.

HOWARD BOICE.

REFERENCES CITED

The following references are of record in the file of this patent:

UNITED STATES PATENTS

| Number | Name | Date |
| --- | --- | --- |
| 765,482 | Hardy | July 19 1904 |
| 2,006,604 | Post | July 2, 1935 |
| 2,238,900 | Hadaway | Apr. 22, 1941 |
| 2,375,290 | Docteur | Nov. 20, 1943 |